(12) United States Patent
Shino et al.

(10) Patent No.: US 6,977,112 B2
(45) Date of Patent: Dec. 20, 2005

(54) NON-CONTACT INFORMATION RECORDING MEDIUM FOR INK-JET RECORDING AND IMAGE FORMING PROCESS

(75) Inventors: Yoshiyuki Shino, Kanagawa (JP); Masahiko Higuma, Chiba (JP)

(73) Assignee: Canon Finetech, Inc., Mitsukaido (JP)

(*) Notice: Subject to any disclaimer, the term of this patent is extended or adjusted under 35 U.S.C. 154(b) by 0 days.

(21) Appl. No.: 09/900,008

(22) Filed: Jul. 9, 2001

(65) Prior Publication Data

US 2002/0021330 A1 Feb. 21, 2002

(30) Foreign Application Priority Data

Jul. 10, 2000 (JP) .............................. 2000-208994

(51) Int. Cl.[7] .............................................. B32B 23/02
(52) U.S. Cl. ............... 428/195.1; 428/32.1; 428/32.18; 428/204; 428/448; 428/915; 503/227; 347/50; 235/492
(58) Field of Search ................ 235/487, 492; 283/904; 257/791, 679; 428/195, 204, 32.1, 428/195.1, 32.18, 448, 915; 503/227; 347/50

(56) References Cited

U.S. PATENT DOCUMENTS

| | | | | |
|---|---|---|---|---|
| 4,841,134 A | * | 6/1989 | Hida et al. ................... 235/488 |
| 5,254,525 A | * | 10/1993 | Nakajima et al. ............ 503/227 |
| 5,313,365 A | * | 5/1994 | Pennisi et al. ............... 361/760 |
| 5,471,044 A | * | 11/1995 | Hotta et al. .................. 235/487 |
| 5,589,307 A | * | 12/1996 | Takeuchi ....................... 430/49 |
| 5,786,055 A | * | 7/1998 | Sei et al. .............. 257/E21.505 |
| 5,786,626 A | * | 7/1998 | Brady et al. ................. 257/673 |
| 5,977,018 A | * | 11/1999 | Moreland .................... 503/201 |
| 6,098,889 A | * | 8/2000 | Ogawa et al. ............... 235/492 |
| 6,106,147 A | * | 8/2000 | Silverbrook ................. 714/762 |
| 6,173,898 B1 | * | 1/2001 | Mande ......................... 235/488 |
| 6,239,483 B1 | * | 5/2001 | Usami et al. ................ 257/679 |
| 6,250,555 B1 | * | 6/2001 | Inamoto ...................... 235/487 |
| 6,398,109 B1 | * | 6/2002 | Ohki ........................... 235/384 |
| 6,447,979 B1 | * | 9/2002 | Hattori et al. ............ 430/270.1 |
| 6,514,367 B1 | * | 2/2003 | Leighton ..................... 156/153 |
| 2001/0031342 A1 | * | 10/2001 | Engle et al. ................. 428/195 |

FOREIGN PATENT DOCUMENTS

| | | |
|---|---|---|
| EP | 0 903 686 A2 | 3/1999 |
| JP | 4-368894 | 12/1992 |
| JP | 9-104189 | 4/1997 |
| JP | 11-91273 | 4/1999 |
| JP | 11-91274 | 4/1999 |
| JP | 11-139055 | 5/1999 |

* cited by examiner

*Primary Examiner*—Rena Dye
*Assistant Examiner*—Tamra L. Dicus
(74) *Attorney, Agent, or Firm*—Fitzpatrick, Cella, Harper & Scinto

(57) ABSTRACT

Disclosed herein is a non-contact information recording medium for ink-jet recording, on and from which information can be recorded and read in a non-contact state from the outside, comprising an electronic information storing circuit part and an image recording part, wherein at least part of the electronic information storing circuit part has an ink/circuit-part barrier structure by which the circuit part undergoes no circuit trouble caused by an ink applied to the image recording part.

20 Claims, 6 Drawing Sheets

NON-CONTACT INFORMATION RECORDING MEDIUM FOR INK-JET RECORDING AND IMAGE FORMING PROCESS

BACKGROUND OF THE INVENTION

1. Field of the Invention

The present invention relates to a non-contact information recording medium suitable for use as a tag attached to an article for the purpose of, for example, conducting a prescribed processing for the article, and particularly to a non-contact information recording medium for ink-jet recording, from and in which information can be read and written in a non-contact state without contacting it, and an image forming process.

2. Related Background Art

Attention is paid to non-contact information recording media having an information storage element such as an IC memory, and a non-contact transmitting-receiving part for controlling recording of information from the information storage element and writing of information into the information storage element which are conducted through non-contact communication with the outside, information carriers for the next generation.

Such a non-contact information recording medium is provided as an IC chip and utilized in various application fields by attaching itself as a non-contact tag to an article. For example, the following utilization fields are mentioned.

A. Field of Transportation:
(1) Automatic fare collection: Parking tickets and electronic event tickets;
(2) Vehicle ID: Location management for industrial railroad, automobile and the like;
(3) Aircraft engine industry: Air package tags and the like.

B. Field of Distribution:
(1) Publication: Book POS slips;
(2) Retail sale: Inventory management labels, delivery check plates and price tags;
(3) Brand: Brand tags equipped with a true/false judging function.

C. Field of Access Control:
(1) Entering and leaving control: ID tags illustrated with a portrait and amusement tags;
(2) Ticket: Tickets for using facilities and event tickets;
(3) Library management: Labels equipped with a book card, and the like.

D. Industrial Field:
(1) Production process: Part assembly, robot indication billboard, subsequent step indication and progress confirmation;
(2) Environmental countermeasure: explosion-proof labels and component indication labels for gas and ink containers;
(3) Others: Delivery parcel check, increase labels for video and CD, integration into product materials, etc.

In a system making use of such a non-contact information recording medium, the prescribed processing can be conducted in a non-contact state without putting the non-contact information recording medium (card, tag or the like) into a processing unit, so that good utility which has not been achieved by the conventional systems can be achieved. In general, a non-contact tag has no image-indicating part which can be visually observed by a person. The form of such a recording medium does not become a problem in a system in which there is no need to directly present information as to an article, to which the recording medium is attached, to a person (customer).

If the non-contact tag can be utilized as a price tag to conduct an accounting processing upon purchase by a customer by reading price information stored in each tag attached to a plurality of articles in a non-contact state, however, inventory management can be conducted more efficiently than present. In such a system, however, the price of the article must be confirmed by a purchaser oneself of the article.

In addition, when such a tag is used in the field of distribution, there is also a system in which peculiar information written in the non-contact tag according to an article is read from the non-contact tag attached to the article at every necessary points to unitarily manage the flow of the article.

Further, it is considered that a tag is attached to an article in the course of the production thereof to use it for production management. In this system, indication of information as to the article, which can be visually confirmed by a field worker or supervisor, becomes indispensable in order to cope with an unexpected situation due to breakage of the tag attached to the article, communication trouble or the like.

In reply to such problems, for example, Japanese Patent Application Laid-Open No. 4-368894 discloses a non-contact recording medium provided with a visible information-recording area composed of a rewritable thermoplastic material on the surface of the recording medium having a non-contact recording means built-in. In this recording medium, a recording area, on which visible information can be thermally and rewritably recorded, is formed on the surface of the non-contact recording medium having the non-contact recording means built-in.

For example, Japanese Patent Application Laid-Open No. 9-104189 discloses an information recording medium containing an antenna and a circuit (semiconductor part) for storing ID information and sending the ID information to the outside by transmitting and receiving communication with the outside, in which a printable and erasable printing medium is provided on the surface thereof, and information related to the ID information has been printed on the printing medium.

However, the conventional non-contact information recording media described above are formed of a rigid body or a material relatively poor in flexibility for the purpose of protecting electronic parts such as an information storage element, a non-contact transmitting and recieving part and an antenna part from being damaged by mechanical stress. An image-indicating part is provided on the surface of the medium of such a form.

The non-contact information recording medium of such a form is suitable for a person to carry it, but has involved a problem that when it is attached to an article and used as a price tag, a label, a production-process-managing tag or the like, various limitations are made on the attachment to the article due to its lack of flexibility.

In the information recording medium disclosed in Japanese Patent Application Laid-Open No. 9-104189, the electronic parts described above are formed on a paper-like base material, and the printing medium, on which a visible image can be recorded repeatedly, is laminated thereon. Therefore, this information recording medium has involved a problem that the electronic parts may be possibly damaged by mechanical stress though it is excellent in flexibility.

In reply to the above problem, Japanese Patent Application Laid-Open Nos. 11-91273 and 11-91274 provide non-contact information recording media excellent in protection of electronic parts against damage by mechanical stress and suitable for use in tag attached to articles for the purpose of conducting a prescribed processing for the articles. When recording by an ink-jet system is conducted thereon, however, they cause a problem that an electronic information-storing circuit part thereof undergoes a circuit trouble caused by the ink components and is corroded. This is considered to be attributed to the fact that part of water and a solvent contained in the ink components generally remain unfixed on a recorded area after the recording and migrate with time to penetrate into the electronic information-storing circuit part.

SUMMARY OF THE INVENTION

Therefore, it is an object of the present invention to provide a non-contact information recording medium for ink-jet recording (hereinafter referred to as "storage medium for IJ recording" merely) excellent in protection of an electronic information-storing circuit part (hereinafter referred to as "circuit part" merely) against damage by ink components and in ink-jet recording properties, and suitable for use in a field of various electronic information recording media, and an image forming process.

The above object can be achieved by the present invention described below.

In the first aspect of the present invention, there is thus provided a storage medium for IJ recording, on and from which information can be recorded and read in a non-contact state from the outside, comprising a circuit part and an image recording part, wherein at least one of the circuit part has an ink/circuit-part barrier structure by which the circuit part undergoes no circuit trouble caused by an ink applied to the image recording part.

In the second aspect of the present invention, there is also provided an image forming process, comprising the step of applying an ink by an ink-jet system to a non-contact information recording medium, on and from which information can be recorded and read in a non-contact state from the outside, said recording medium comprising a circuit part having an ink/circuit-part barrier structure and an image recording part, thereby forming an image.

DESCRIPTION OF THE PREFERRED EMBODIMENTS

The present invention will hereinafter be described in more detail by preferred embodiments.

In the first aspect of the present invention, deterioration of the circuit part after ink-jet recording is markedly reduced by providing an ink/circuit-part barrier structure. This deterioration is attributed to the fact that the circuit part is weak to water, or an acid or alkaline component in an ink generally used in an ink-jet system. It is considered that when the ink component remaining in the image recording part (ink-receiving layer) comes into contact with at least part of the circuit part, the deterioration of the circuit part is promoted.

Accordingly, the ink/circuit-part barrier structure used in the present invention is so constructed that the components in the ink applied by the ink-jet system are prevented from diffusing or penetrating into the image recording part to reach the circuit part.

Embodiments of the first aspect of the present invention include the following embodiments:

(1) At least one ink barrier layer is provided between the image recording part and the circuit part;
(2) The image recording part is formed into a structure by which diffusion or penetration of the ink components can be controlled; and
(3) The recording medium is produced into a structure in which the image recording part is not laminated on the circuit part.

The embodiment (1) will be first described.

In the embodiment (1), the recording medium is so constructed that at least one ink barrier layer is provided between the image recording part and the circuit part, whereby an ink applied by the ink-jet system is prevented from diffusing or penetrating into the image recording part to reach the circuit part.

Accordingly, the ink barrier layer can be provided at any position so far as the position is between the image recording part and the circuit part. No particular limitation is imposed on the image recording part in the present invention so far as an image can be formed thereon by ink-jet recording. For example, it may be that like plain paper, on which ink-jet recording can be conducted by itself, or an ink-receiving layer, which will be described subsequently, may be provided separately.

Figure 1:
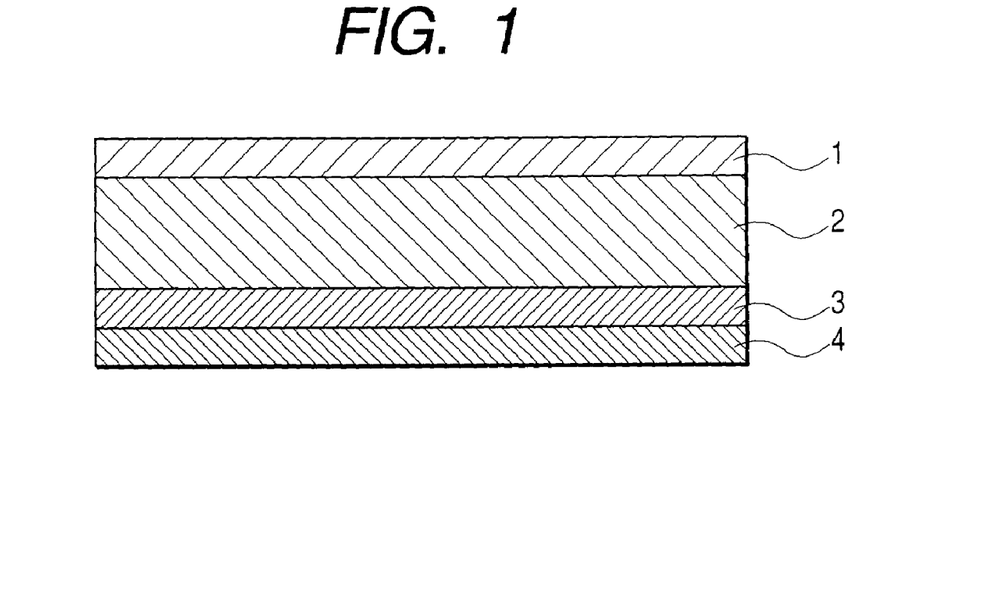
FIG. 1 is a typical cross-sectional view of a storage medium for IJ recording according to the present invention.

FIG. 1 is a typical cross-sectional view of the storage medium for IJ recording according to the first embodiment. Reference numeral 2 indicates a base material. On one side thereof, an ink-receiving layer 1 is provided, and on the opposite side thereto, a circuit part 4 is provided through an ink barrier layer 3.

Figure 2:
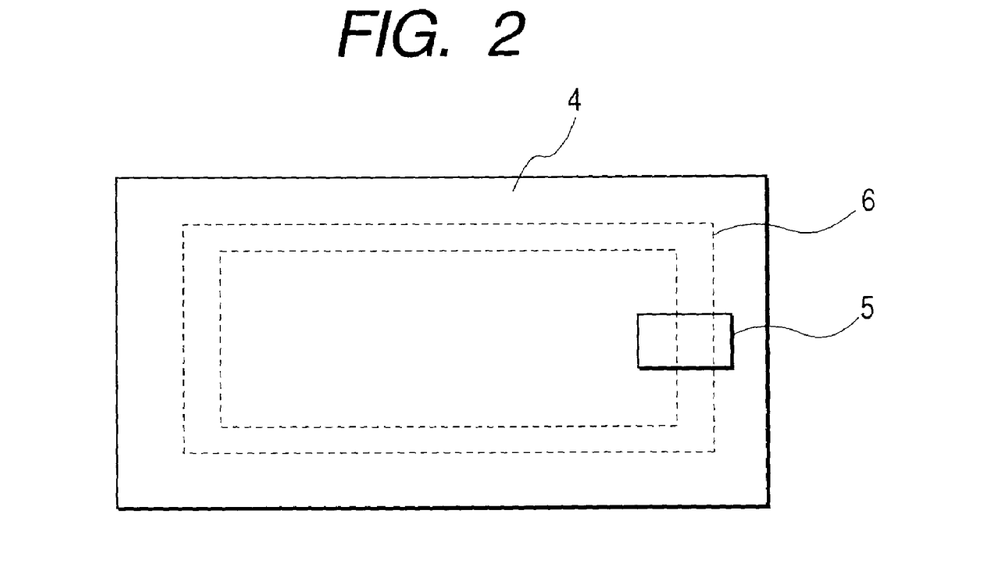
FIG. 2 is a plan view typically illustrating a circuit part of the storage medium for IJ recording in FIG. 1.

FIG. 2 is a plan view typically illustrating the circuit part 4 used in the present invention. The circuit part 4 is constructed as an independent part by integral molding by which a transmitting-recieving antenna 6 composed of a loop-like coil or the like, and a non-contact information storage element (LSI chip) 5 are integrated with a resin. As described above, in the circuit part 4, the non-contact information storage element is integrally molded with the resin having high stiffness, so that the circuit part 4 is excellent in mechanical durability and has high reliability.

As examples of a material for forming the ink barrier layer 3 used in the present invention, may be mentioned conventionally known coupling agents (silane type and titanium type), surfactants and resins (including emulsions). In particular, the resins are preferably used because a uniform and tough continuous film can be easily formed. Examples of such resins include polyethylene, polypropylene, polystyrene, polyisoprene, cellulose, cellulose acetate, polyvinyl acetate, polyvinyl acetal, polymethacrylates, polyester, polycarbonate, epoxy resins, phenol resins, alkyd resins, polyacrylonitrile, polyamide, urea resins, melamine resins, urethane resins, polyvinyl chloride, polyvinylidene chloride, polychloroprene, polyfluoroethylene, polytrifluorochloroethylene and silicone resins. Among these, those having excellent water resistance, alkali resistance and acid resistance are preferably chosen. A resin used is preferably high-purity, and so impurities such as alkali metal ions and a chloride ion may preferably be removed therefrom.

In order to form the ink barrier layer 3 so as to prevent an ink applied by an ink-jet system from diffusing or penetrating into the image recording part to reach the circuit part 4, the ink barrier layer 3 has an air permeability of at least 300 sec/100 cc, preferably at least 1,000 sec/100 cc, more preferably at least 5,000 sec/100 cc as measured in accordance with JIS P 8117 (Gurley air permeability testing method) prescribing a testing method for air permeability of paper and the like, in which the time required until 100 ml of air pass through an area of 645 mm$^2$ is measured. It goes without saying that it is preferable that the ink be completely shielded by the ink barrier layer.

The thickness of such an ink barrier layer as described above is preferably within a range of from 0.5 to 20 µm, more preferably from 1 to 10 µm. If the thickness of the ink barrier layer is too thin, any effect satisfying the present invention is difficult to achieve. If the thickness is too thick on the other hand, good flexibility is hard to achieve. However, the present invention is not limited to these methods. There may be allowed, for example, a method in which a base material to the surface of which a releasing treatment has been already subjected is used and a method in which a base material composed of a water-repellent material is used so as to combine it with the ink barrier layer.

Only the non-contact information storage element 5 may be sealed with a sealant to shield it from an ink. As materials for forming the sealant (ink barrier layer) for satisfying such property, may be suitably used the materials used in the ink barrier layer described above. Among these, silicone-modified organic high-molecular compounds or epoxy resin compositions comprising an epoxy resin as a main component are preferred from the viewpoints of water resistance and solvent resistance.

The concentration of ionic chlorine, which is an impurity in the above-described sealant, is desirably at most 100 ppm, preferably at most 50 ppm. If the concentration of the ionic chlorine exceeds 100 ppm, there is a tendency of water in an ink to cause sodium chloride or the like to dissociate and migrate to raise frequency of corrosion on the non-contact information storage element caused by a chemical reaction or electrical reaction.

The epoxy resin compositions comprise an epoxy resin and a curing agent as main components and may suitably contain an inorganic filler, a curing accelerator and the like as needed. As the epoxy resin, may be used a phenol type of any of glycidyl ethers such as bisphenol A, bisphenol F, tetrabromobisphenol A tetraphenylolethane, phenol novolak and o-cresol novolak, and an alcohol type of glycidyl ethers such as polypropylene glycol and hydrogenated bisphenol A.

As the curing agent, an agent that generally functions as a curing agent for epoxy resins is selected. Among others, a curing agent which is excellent in ink resistance, generally used in transfer molding and comprises an acid anhydride as a main component is preferred. Since an acid anhydride-curing epoxy resin is cured at a relatively high temperature (120 to 170° C.), tablets in which an epoxy main material and a curing agent are blended with a filler, a silane coupling agent, a flame retardant and the like in predetermined proportions are formed in advance, whereby a resin having stable properties can be used with good workability.

As examples of the acid anhydride curing agent, may be mentioned phthalic anhydride, tetrahydrophthalic anhydride, hexahydrophthalic anhydride, trimellitic anhydride, pyromellitic anhydride, benzophenone-tetracarboxylic acid anhydride, chlorendic anhydride, dodecynylsuccinic anhydride, methyltetrahydrophthalic anhydride, methylhexahydrophthalic anhydride and methylhimic anhydride.

As the filler, may be added carbon black, silica, titanium oxide or the like. In addition, additives such as a stabilizer, a silane coupling agent and flame retardant may be mixed in advance in predetermined proportions.

A moisture-curable silicone sealant may be used according to workability and the heat resistance of the base material. To an ordinary moisture-curable sealant, a condensation catalyst such as a organic tin compound, a filler such as calcium carbonate, a pigment such as titanium oxide or carbon black, a plasticizer such as a phthalic ester, and besides additives such as an anti-sagging agent are added, and they are uniformly kneaded. The content of the silicone-modified organic high-molecular compound, which is a main component, is preferably about 30 to 50%.

The viscosity of the silicone-modified organic high-molecular compound is mainly dominated by the content of the high-molecular component. However, the viscosity of the sealant can be greatly reduced by decreasing the high-molecular component to narrow the molecular weight distribution thereof. In order to specify the viscosity of the sealant in the present invention, it is desirable that the weight average molecular weight (Mw) be at most 30,000, preferably 1,000 to 20,000, and the degree of distribution (Mw/Mn) which is a value with respect to the number average molecular weight (Mn) be at most 3. Such molecular weight distribution can be determined by a general-purpose GPC apparatus. The molecular weight distribution may be controlled by subjecting a polymeric material produced to molecular weights fractionation or removing low-molecular compounds by distillation in addition to the control of production conditions of the polymeric material. As a method of molecular weight fractionation, a polymeric material may also be dissolved in tetrahydrofuran or the like and then precipitated with n-hexane, thereby modifying the polymeric material into a polymeric material having a desired molecular weight.

As a material for forming the ink-receiving layer in the present invention, may be used any of the conventionally known materials. Specific examples thereof include hydrophilic natural materials such as albumin, gelatin, casein, starch, cationic starch, gum arabic, polyvinyl imidazole, agar and sodium alginate; and water-soluble or hydrophilic synthetic resins such as dextrin, viscose, methyl cellulose, ethyl cellulose, carboxymethyl cellulose, hydroxyethyl cellulose, cationically modified hydroxyethyl cellulose, polyvinyl alcohol, cationically modified polyvinyl alcohol, acetal-modified polyvinyl alcohol (polyvinyl acetal), polyethylene glycol, polypropylene glycol, polyacrylic acid, water-soluble alkyds, polyvinyl ether, polyvinyl pyrrolidone, quaternized polyvinyl pyrrolidone, polyamides, polyacrylamides, poly(N-vinyl-3-methyl-pyrrolidone), polymaleic acid copolymers, polyethylene imines, polyethylene oxide, polyvinyl imidazole, polyallylamines, polyallylamine hydrochlorides, melamine resins, polyurethanes and polyesters. At least one of these material may be used as desired. The ink-receiving layer may be a single layer or formed into a multi-layer structure for the purpose of imparting high performance.

In order to improve ink-jet recording suitability, for example, beading resistance, blocking resistance, etc. and further to improve the shelf stability of the resulting ink-jet recorded article, for example, bleeding or feathering and water fastness of an image under a high-humidity environment, a water-soluble low-molecular organic compound and a cationic compound, and further a water-insoluble organic compound may be suitably used in addition to the above-described materials.

Examples of the water-soluble low low-molecular organic compound used at this time include polyhydric alcohols having a weight average molecular weight of at most 5,000, represented by ethylene glycol, polyethylene glycol, poly (ethylene glycol-propylene glycol) copolymers, D-sorbitol and sucrose.

Examples of the cationic compound include primary, secondary and tertiary amine salt type compounds, for example, the hydrochlorides and acetates of laurylamine, coconut amine, stearylamine, rosin amine and the like; quaternary ammonium salt type compounds, for example, lauryltrimethylammonium chloride, lauryldimethylbenzyl-ammonium chloride, benzyltributylammonium chloride, benzalkonium chloride and the like; pyridinium salt type compounds, for example, cetylpyridinium chloride and the like; imidazoline type cationic compounds, for example, 2-heptadecenyl-hydroxyethylimidazoline and the like; and ethylene oxide adducts of higher alkylamines, for example, dihydroxyethylstearylamine and the like.

Examples of the water-insoluble organic compound include acrylic resins represented by polymethyl methacrylate, polyamides represented by 6,6-nylon, polyvinyl acetals represented by butyral resins, and besides polyethylene, polypropylene, polystyrene resins, polyvinyl chloride, phenol resins, epoxy resins, polyesters, polyurethanes, diacetate compounds and D-sorbitol/aromatic aldehyde condensates.

In order to improve physical properties, for example, blocking resistance, of the recording medium for ink-jet, the conventionally known organic or inorganic fine particles (powder, emulsion, etc.) may be added to the ink-receiving layer in a proportion of, for example, about 0.01 to 1.0 g/m$^2$. Besides, the conventionally known additives such as various kinds of surfactants and oils such as dispersing agents, lubricants and anti-foaming agents, pH adjustors, fluorescent dyes, and preservatives may be used within limits not reducing the performance of the recording media according to the present invention.

The thickness of the above-described ink-receiving layer is preferably within a range of from 1 to 100 µm, more preferably from 2 to 50 µm. If the thickness of the ink-receiving layer is too thin, an intended effect is hard to achieve from the viewpoint of ink absorbency necessary for forming ink-jet images. If the thickness is too thick on the other hand, good flexibility is hard to achieve, causing conveyance failure upon formation of images.

As the base material used in the storage medium for IJ recording according to the present invention, may be any base material so far as it can support such ink-receiving layer, ink barrier layer and circuit part as described above and be conveyed in a printer. Specific examples thereof include flexible base materials such as films of synthetic resins such as polyesters, diacetates, triacetates, acrylic polymers, polycarbonate, polyvinyl chloride, polyimides, cellophane and celluloid, paper, fabrics, and nonwoven fabrics.

As a method of forming the ink-receiving layer and ink barrier layer on the base material in the present invention, respective coating formulations comprising such materials as described above may be separately applied to the base material by means of the conventionally known coating method, for example, a roll coating, rod bar coating, spray coating or air knife coating method to form them.

Figure 3:
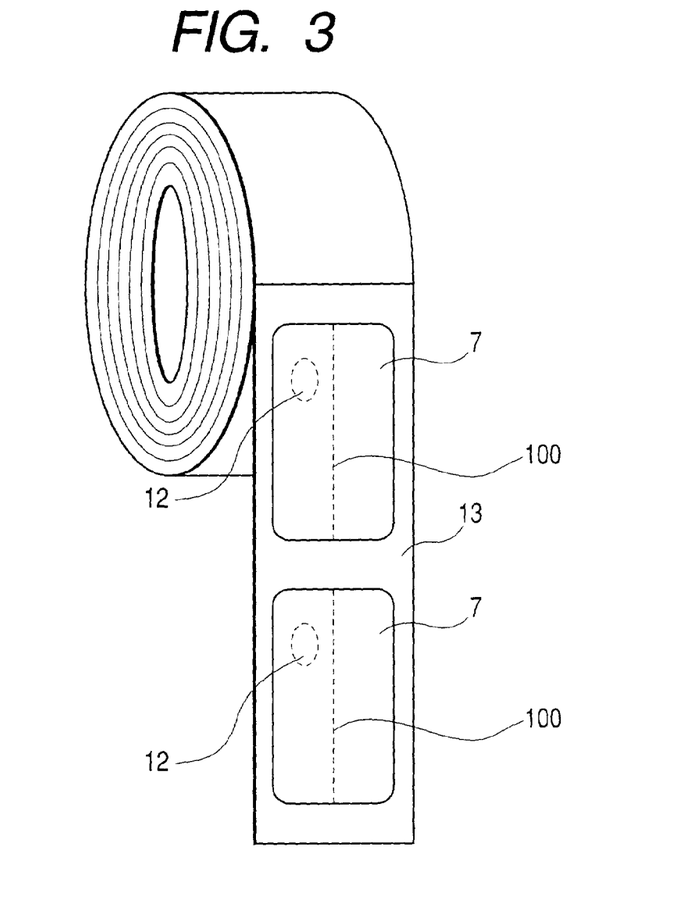
FIG. 3 schematically illustrates a storage medium for IJ recording according to another embodiment of the present invention in the form of a roll used as a tag.
Figure 4:
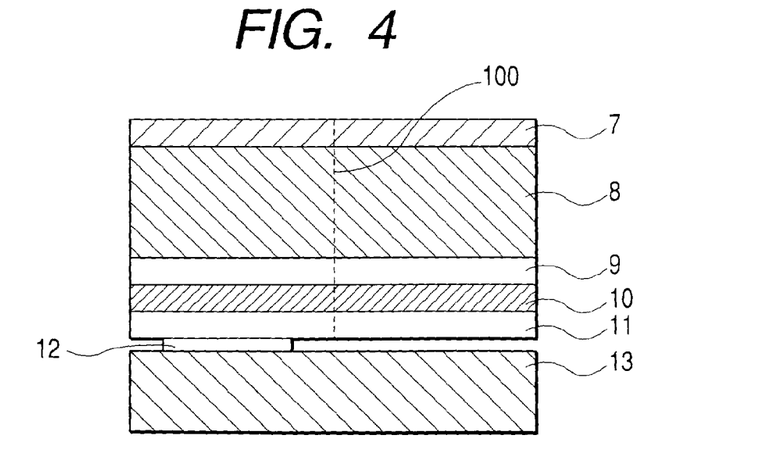
FIG. 4 is a typical cross-sectional view of the storage medium for IJ recording in FIG. 3.

As other embodiments of the first aspect of the present invention, a sticking layer (adhesive layer) and a releasing layer may also be further provided. In the storage medium for IJ recording used as, for example, a tag as illustrated in FIGS. 3 and 4, a circuit part 12, a sticking layer 11, an ink barrier layer 10, a sticking layer 9, a base material 8 and an ink-receiving layer 7 are laminated on a releasing layer 13. After conducting recording on the ink-receiving layer 7, the laminate of the circuit part 12, the sticking layer 11, the ink barrier layer 10, the sticking layer 9, the base material 8 and the ink-receiving layer 7 is released from the releasing layer 13 in the form of a roll, and the storage medium for IJ recording according to the present invention is folded along a broken line 100 with the sticking layer 11 inside to provide a tag.

Figure 5:
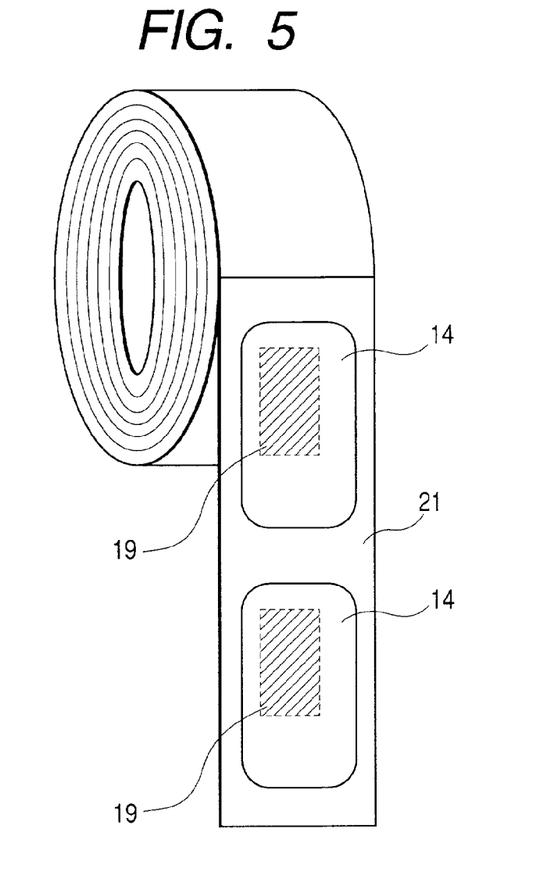
FIG. 5 schematically illustrates a storage medium for IJ recording according to a further embodiment of the present invention in the form of a roll used as a label.
Figure 6:
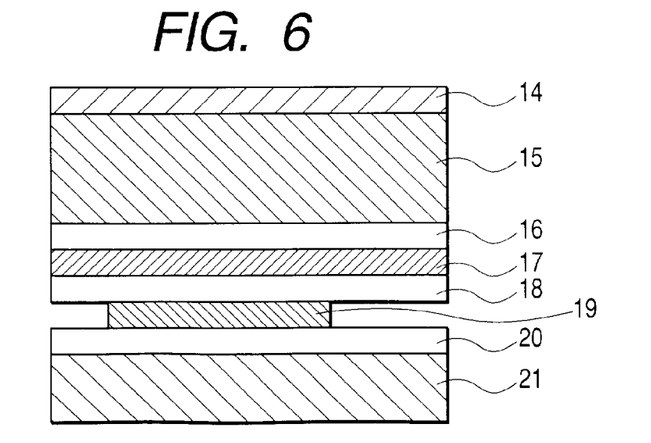
FIG. 6 is a typical cross-sectional view of the storage medium for IJ recording in FIG. 5.

In the storage medium for IJ recording used as such a label as illustrated in FIGS. 5 and 6, a sticking layer 20, a circuit part 19, a sticking layer 18, an ink barrier layer 17, a sticking layer 16, a base material 15 and an ink-receiving layer 14 are laminated on a releasing layer 21. After conducting recording on the ink-receiving layer 14, the laminate of the sticking layer 20, the circuit part 19, the sticking layer 18, the ink barrier layer 17, the sticking layer 16, the base material 15 and the ink-receiving layer 14 is released from the releasing layer 21 in the form of a roll, and the laminate can be stuck on any position by the sticking layer 20.

When the circuit part is laminated on the image recording part through a sticking layer, they may be produced independently of each other. Therefore, various processes become feasible for the storage medium for IJ recording.

As a sticking material contained in the sticking layer, may be used any of various kinds of publicly known sticking materials of the solvent type or solventless type, such as rubber, acrylic, silicon, polyester and vinyl ether types. As the rubber type sticking material, neutral rubber, styrene-butadiene rubber or the like is used as a main material, and a rosin resin and various kinds of plasticizers are contained therein.

Examples of the acrylic type sticking material include copolymers of various acrylates such as butyl acrylate, ethyl acrylate and 2-ethylhexyl acrylate, and acrylic acid. The representative of the polyester type sticking material is a polyester resin. Examples of the vinyl ether type sticking material include polyvinyl acetate, polyvinyl acetate copolymers and ethylene-vinyl acetate copolymers.

In order to improve heat resistance and solvent resistance, various kinds of additives, such as crosslinking agents such as an isocyanate or melamine, inorganic pigments such as silica, kaolin, clay, zinc oxide and titanium oxide, water-soluble polymers, various kinds of paraffin waxes, plasticizers, antistatic agents, thickeners, silicon oils, anti-foaming agents, and surfactants may be added to the sticking layer containing the sticking material.

Examples of a material used in the releasing layer include, first of all, hot-melt materials, such as waxes such as carnauba wax, paraffin wax, microcrystalline wax and castor wax; higher fatty acids and derivatives thereof such as metal salts and esters, such as stearic acid, palmitic acid, lauric acid, aluminum stearate, lead stearate, barium stearate, zinc stearate, zinc palmitate, methyl hydroxystearate, glycerol monohydroxy-stearate and glycerol monohydroxypalmitate; polyamide resins, petroleum resins, rosin resins, cumarone-indene resins, terpene resins, novolak resins, styrene resins, olefin resins such as polyethylene, polypropylene, polybutene and oxidized polyolefins, and vinyl ether resins. Besides these materials, silicone resins, fluorosilicone resins, fluoroolefin-vinyl ether terpolymers, perfluoroepoxy resins, thermosetting acrylic resins having a perfluoroalkyl group at their side chains, vinylidene fluoride type curing paints, etc. may also be used.

The storage medium for IJ recording according to the present invention may be overcoated with a laminating agent for the purpose of protecting it during its distribution. In addition, a forgery-preventing layer may be laminated on the image recording part and the circuit part from the viewpoint of security.

The embodiment (2) will be then described.

In the embodiment (2), the recording medium is so constructed that the image recording part is formed into a structure by which diffusion or penetration of ink components can be controlled, whereby an ink applied by the ink-jet system is prevented from diffusing or penetrating into the image recording part to reach the circuit part.

As the form of the embodiment (2), the lamination of the image recording part can be achieved by laminating a layer formed with a material having a large ink absorptivity on a layer formed with a material having a small ink absorptivity. Alternatively, it may also be achieved by increasing the thickness of the image recording part. As materials for constituting the ink-receiving layer, the base material and the circuit part, may be preferably used the same materials as those used in the embodiment (1), and so their description is omitted.

Figure 7:
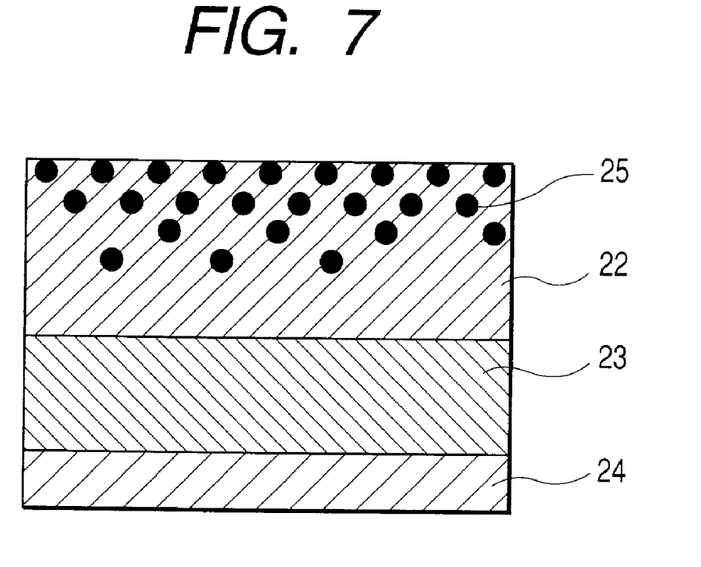
FIG. 7 is a typical cross-sectional view of a storage medium for IJ recording according to a still further embodiment of the present invention.

FIG. 7 is a typical cross-sectional view of a storage medium for IJ recording according to the embodiment (2) and illustrates an example where an ink-receiving layer 22 is formed thick. Reference numeral 23 indicates a base material. On one side thereof, the ink-receiving layer 22 is provided, and on the opposite side thereto, a circuit part 24 is provided. The thickness of the ink-receiving layer is preferably at least 10 $\mu$m, more preferably at least 20 $\mu$m. An ink 25 absorbed in the ink-receiving layer 22 does not reach the circuit part 24.

The embodiment (3) will now be described.

Figure 8:
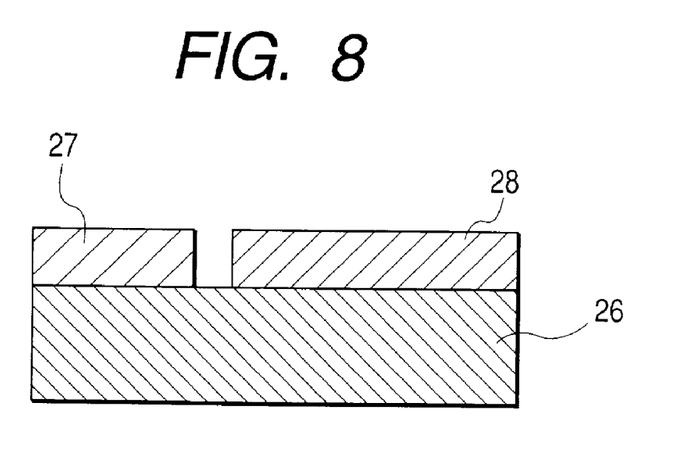
FIG. 8 is a typical cross-sectional view of a storage medium for IJ recording according to a yet still further embodiment of the present invention.
Figure 9:
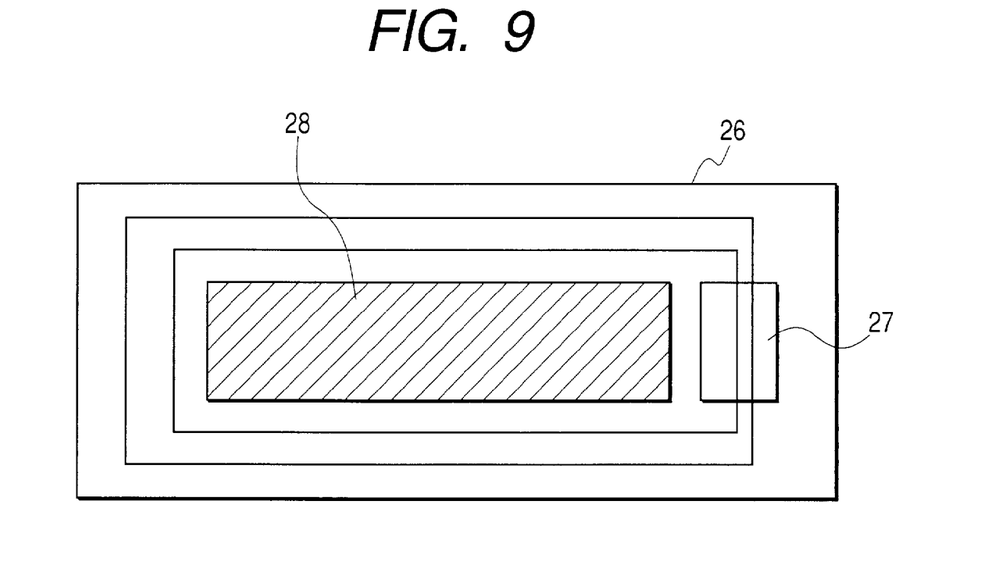
FIG. 9 is a typical plan view of the storage medium for IJ recording according to the yet still further embodiment of the present invention.

In the embodiment (3), as illustrated in FIGS. 8 and 9, the recording medium is produced into a structure in which the image recording part is not laminated on the circuit part, whereby an ink applied by the ink-jet system is prevented from diffusing or penetrating into the ink-receiving layer to reach the circuit part. Reference numeral 26 indicates a base material, 28 an ink-receiving layer, and 27 a circuit part.

As materials for constituting the ink-receiving layer, the base material and the circuit part, may be preferably used the same materials as those used in the embodiment (1), and so their description is omitted. However, the circuit part may preferably be subjected to a water-repellency treatment so as to prevent ink components from penetrating into the circuit part. As methods for conducting to the water-repellency treatment, may be mentioned the following methods. However, the present invention is not limited to these methods.

(1) A method in which a water-repellent layer is formed on the circuit part from a heat-resistant resin containing a lubricant or releasing agent; and (2) A method in which a water-repellent layer is formed on the circuit part from a silicone resin, a fluororesin or a copolymer containing these resin segments.

The storage media for IJ recording according to the embodiments (1) to (3) of the first aspect of the present invention may be all used either as cut sheets or in the form of a roll as illustrated in FIGS. 3 and 5.

The second aspect of the present invention will hereinafter be described.

The second aspect is directed to an image forming process, comprising the step of applying an ink by an ink-jet system to a storage medium for IJ recording, on and from which information can be recorded and read in a non-contact state from the outside, said storage medium comprising a circuit part having an ink/circuit-part barrier structure and an image recording part.

In the second aspect, deterioration of the circuit part after ink-jet recording is markedly reduced by preventing the circuit part from undergoing a circuit trouble caused by an ink applied to the image recording part.

Embodiments of the second aspect of the present invention include the following embodiments:

(4) A process in which an ink, which does not damage the circuit part, is used to form an image; and (5) A process in which an image is formed with an application density of an ink, which does not damage the circuit part.

In the embodiment (4), an ink, which does not damage the circuit part, is used to form an image. For example, the ink used in the embodiment (4) is an ink in which the amount of a penetrability-imparting agent has been controlled, or an ink which is solidified after application of the ink with known methods so as not to penetrate up to the circuit part.

As examples of preferable penetrability-imparting agents used in the present invention, may be mentioned monohydric alcohols and surfactants. More specifically, examples of the monohydric alcohols include ethyl alcohol, propyl alcohol, isopropyl alcohol, n-butyl alcohol, isobutyl alcohol, n-pentanol, cyclohexanol and benzyl alcohol.

No particular limitation is imposed on the surfactants, and as examples thereof, may be mentioned polyoxyethylene alkyl ethers, polyoxyethylene alkyl phenol ethers, polyoxyethylene alkylphenyl ethers, polyoxyethylene alkylphenyl alkyl ethers, polyoxyethylene aliphatic ethers, sorbitan esters, acetylene glycol and fluorine containing surfactants. However, this agent is not particularly limited thereto. As the penetrability-imparting agent, the above-mentioned monohydric alcohols and surfactants may be used either singly or in any combination thereof. However, the present invention is not limited thereto.

The optimum amount of the penetrability-imparting agent to an ink will be now described. The optimum amount of the penetrability-imparting agent varies according to the greatest density of an ink shot per unit area, the recording frequency of an ink-jet head used, a recording method, etc. However, the preferable amount of the penetrability-imparting agent added is preferably at most 2% by weight.

The inks used in the present invention are characterized in that the penetrability-imparting agent is contained in such a specified proportion as described above together with a recording agent. However, water and an organic solvent, and besides additives such as various kinds of dispersing agents, viscosity modifiers, surface tension modifiers, fluorescent brighteners, antioxidants, mildewproofing agents and pH adjustors may be added as other constitutive components, as needed, within limits not preventing the achievement of the object of the present invention. The pH values of the inks are preferably controlled to 6 to 8 from the viewpoint of causing no circuit trouble to the circuit part.

As examples of the recording agent used in the inks according to the present invention, may be mentioned direct dyes, acid dyes, food colors, basic dyes, reactive dyes, disperse dyes, vat dyes, soluble vat dyes, reactive disperse dyes, oil-soluble dyes and pigments. Water-based inks are preferred from the viewpoint of safety according to applications used, and water-based pigment inks are more preferred when weathering resistance is taken into consideration.

The content of these recording agents is determined depending upon the type of a liquid medium component, properties required of the inks, etc. However, they are generally contained in a proportion of 0.2 to 20% by weight, preferably 0.5 to 10% by weight, more preferably 1 to 5% by weight based on the total weight of each ink.

Examples of organic solvents usable in the present invention include amides such as dimethylformamide and dimethylacetamide; ketones and ketone alcohols such as acetone and diacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polypropylene glycol; alkylene glycols such as ethylene glycol, propylene glycol, trimethylene glycol, butylene glycol and hexylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; and 1,3-dimethyl-2-imidazolidinone.

The content of the organic solvents is generally within a range of from 1 to 50% by weight, preferably from 2 to 30% by weight, based on the total weight of each ink. Such organic solvents as mentioned above may be used either singly or in any combination thereof. The most preferable liquid medium component is such that it is composed of water and at least one organic solvent, and the solvent contains at least one water-soluble high-boiling solvent, for example, a polyhydric alcohol such as diethylene glycol, triethylene glycol or glycerol.

The inks used in the present invention may be suitably applied to all the general ink-jet recording systems, but are particularly suitable for use in an ink-jet recording system of a type in which an ink is ejected by the bubbling phenomenon of the ink caused by thermal energy. The inks according to the present invention may desirably be controlled so as to have, as their own physical properties at 25° C., a viscosity of 0.5 to 20 cP, preferably 0.5 to 10 cP and a surface tension of 25 to 68 dyn/cm.

In the embodiment (5), an ink is applied to the image recording part with an application density of the ink, which does not damage the circuit part to form an image, whereby the ink applied by an ink-jet system is prevented from diffusing or penetrating into the image recording part to reach the circuit part.

In the embodiment (5), the application density of the ink when recording is conducted by the ink-jet system is within a range of 400% or lower, preferably 200% or lower. If the application density exceeds 400%, the ink not only affects the circuit part, but also causes transferred ink to back side upon continuous paper discharge.

In order to protect the information storage element of the storage medium for IJ recording from being damaged by ink components, it is preferable to use an ink-jet printer in which a sensor for preventing the application density of the ink at the circuit part from exceeding 400%, preferably 200% is provided, or to use a recording method capable of setting the circuit part as a non-printing region. Further, there may also be provided a function that hot air is blown against a paper discharge part in a printer within limits not affecting the information recording part to dry the solvent component in the ink-receiving layer.

Ink-jet recording apparatus suitable for use in the above-described ink-jet recording processes used in the present invention will hereinafter be described.

Figure 10:
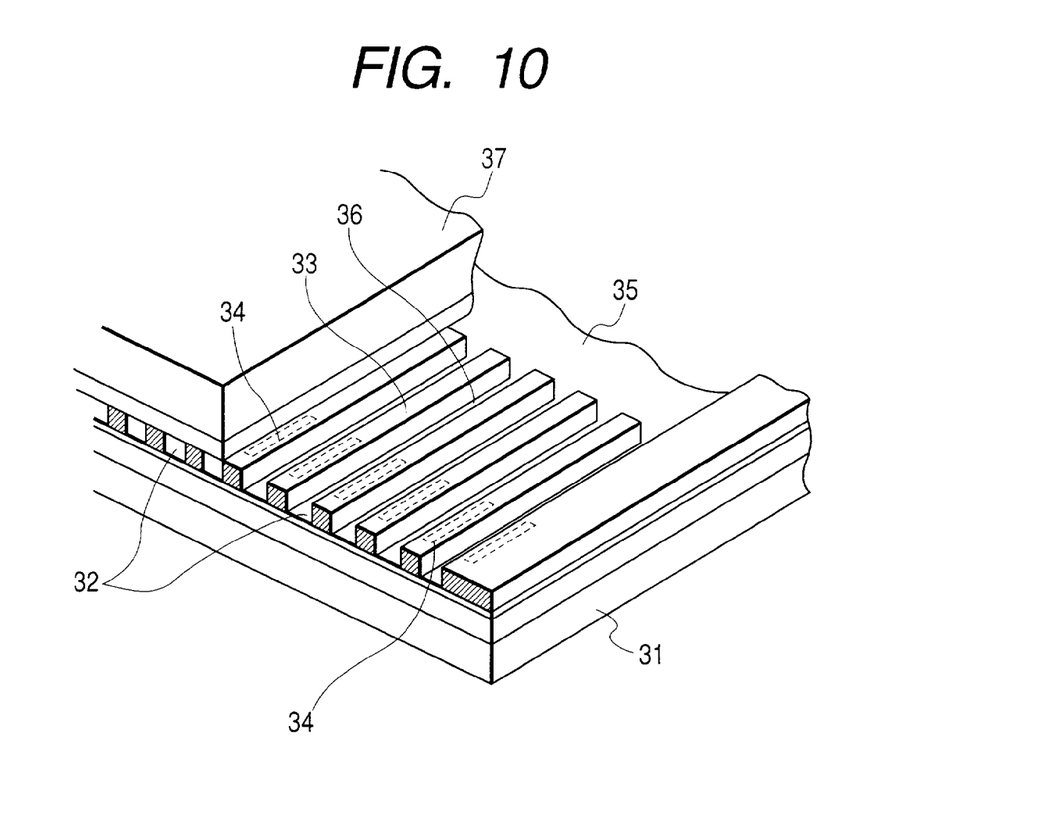
FIG. 10 is a perspective view illustrating the internal structure of a bubble-jet recording head.

FIG. 10 is a typical drawing for illustrating the structure of a bubble-jet recording head used in this embodiment. In each nozzle 36, its corresponding heater 34 is provided, the prescribed energy is applied to the heater 34 by a head drive circuit, whereby the heater is heated to generate a bubble, and an ink droplet is ejected from an ejection opening 32 by the action thereof. Incidentally, the heater 34 is formed on a silicon substrate 31 by the same technique as in a semiconductor production process. Reference numeral 33 indicates a nozzle partition constituting each nozzle 36, 35 a common liquid chamber for feeding an ink to each nozzle 36, and 37 a top plate.

Figure 11:
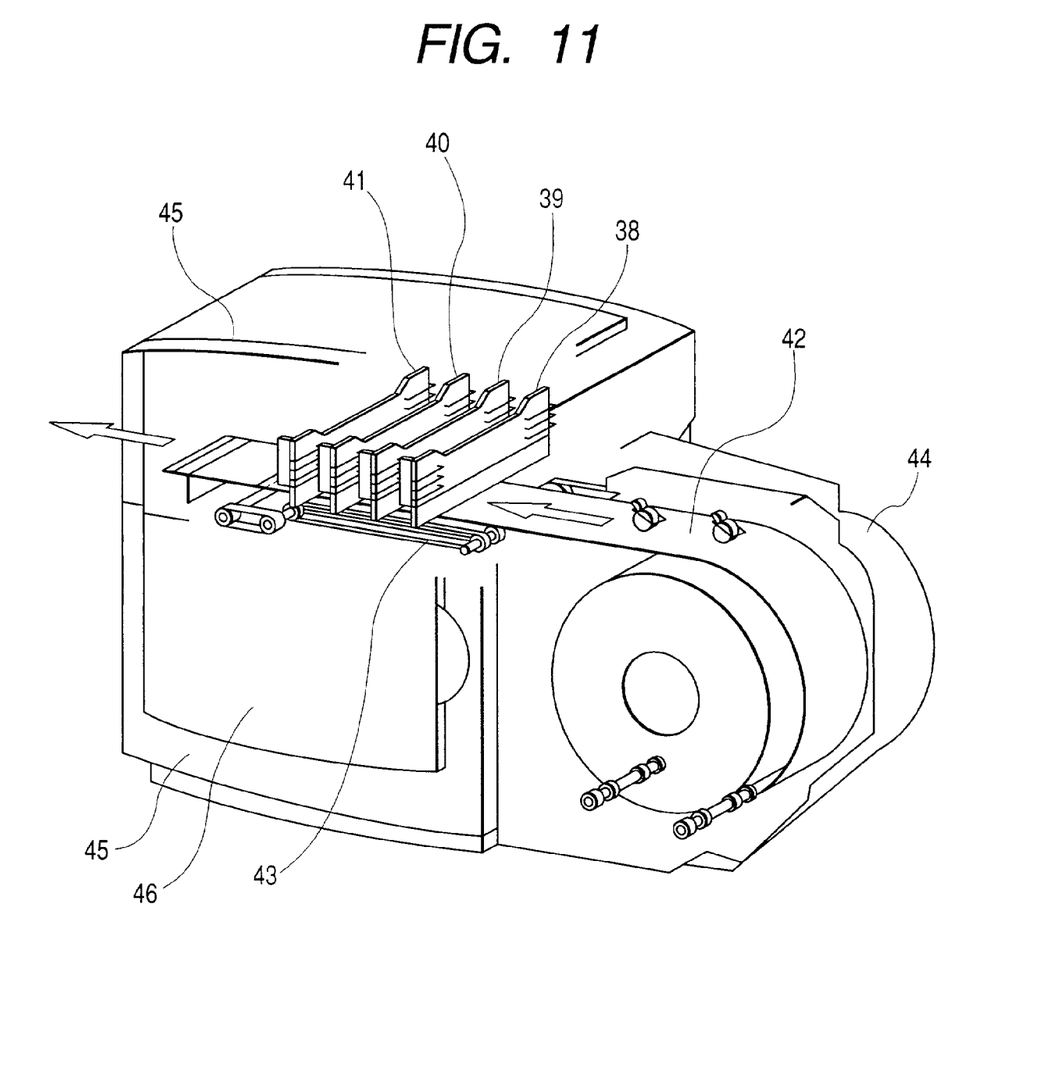
FIG. 11 is a perspective view illustrating the internal structure of an ink-jet recording apparatus.

FIG. 11 is a perspective view of an ink-jet recording apparatus according to this embodiment partially seeing through.

A PHS unit 45 is conposed of ink-jet heads 38 to 41 and a recovery system unit (not illustrated) for always ensuring stable ejection. The storage medium 42 for IJ recording according to the present invention is fed from a rolled feed unit 44 and continuously conveyed by a conveying unit 43 with which the recording apparatus body 45 is equipped.

While conveying the storage medium for IJ recording according to the present invention, a black ink is ejected from the ink-jet recording head at the time the reference position of the storage medium for IJ recording according to the present invention is moved to the position under the ink-jet recording head 38 for black. Similarly, inks of respective colors are ejected in order of the ink-jet recording head 39 for cyan, the ink-jet recording head 40 for magenta and the ink-jet recording head 41 for yellow to form a color image.

The recording apparatus body 45 is composed of the conveying unit 43, respective ink cartridges storing the inks to be fed to the ink-jet recording heads, a pump unit for feeding the inks to the recording heads and conducting recovery operation, a control board for controlling the whole recording apparatus, etc. (however, the ink cartridges, pump unit and control board are not illustrated). A front door 46 is an opening and closing door for exchanging the ink cartridges.

According to the storage media for IJ recording according to the present invention, as described above, a proper and normal state can be retained, and recording media having an excellent ink-jet recording part as a whole are provided. Since the structure is such that the circuit part and the image recording part are bonded to each other, the respective parts can be variously combined. For example, the sizes of both parts can be optionally preset.

Since the formation of the circuit part and the formation of the image recording part can be conducted independently of each other, various processes become feasible in the production of the non-contact information storage media. In the storage media for IJ recording equipped with the image recording part by ink-jet recording, the formation of an image can be conducted in no contact with the storage media for IJ recording, and so processing at both circuit part and image recording part can be conducted in a non-contact state. Accordingly, even when the circuit part is projected from the non-contact information storage medium, recording of an image can be conducted without hindrance, and moreover an image can be formed even on an image recording part provided on the arrangement site of the circuit part.

The storage media for IJ recording have a feature that the circuit part is formed with a rigid body and strong to mechanical stress from the outside, while the image recording part is excellent in flexibility, soft and easy to be deformed. Beacause of this feature, high reliability is ensured at the circuit part, and the mode of a non-contact information recording medium for ink-jet recording is satisfied without a sense of incompatibility with the conventional price tag media and label media.

What is claimed is:

1. An information recording medium comprising an electronic information storing circuit part, a base material and an ink receiving layer comprising a water-soluble or hydrophilic synthetic resin, in this order, and further comprising a barrier layer for preventing ink components applied to the ink receiving layer from reaching the electronic information storing circuit part and having a concentration of ionic chlorine of 100 ppm or less, wherein the barrier layer is provided between the electronic information storing circuit part and the base material, and wherein the barrier layer has an air permeability of at least 300 sec/100 cc as measured in accordance with the Gurley air permeability testing method.

2. The information recording medium according to claim 1, wherein the barrier layer has a thickness of 0.5 to 20 µm.

3. An information recording medium comprising an electronic information storing circuit part and an ink receiving layer comprising a water-soluble or hydrophilic synthetic resin, in this order, and further comprising a barrier layer for preventing ink components applied with an ink jet head to the ink receiving layer from reaching the electronic information storing circuit part and having a concentration of ionic chlorine of 100 ppm or less, wherein the barrier layer is provided between the electronic information storing circuit part and the ink receiving layer, and wherein the barrier layer has an air permeability of at least 300 sec/100 cc as measured in accordance with the Gurley air permeability testing method.

4. The information recording medium according to claim 1, wherein ink-jet recording can be carried out on the recording medium.

5. The information recording medium according to claim 1, wherein the recording medium is used as a non-contact tag.

6. The information recording medium according to claim 3, wherein the barrier layer comprises a silicon-modified organic high-molecular weight compound or an epoxy resin composition.

7. An information recording medium comprising an electronic information storing circuit part, a base material and an ink receiving layer comprising a water-soluble or hydrophilic synthetic resin, in this order, and further comprising a barrier layer for preventing ink components applied to the ink receiving layer from reaching the electronic information storing circuit part, wherein the barrier layer is provided between the electronic information storing circuit part and the base material, and wherein the barrier layer has an air permeability of at least 300 sec/100 cc as measured in accordance with the Gurley air permeability method.

8. The information recording medium according to claim 7, wherein the ink receiving layer contains inorganic fine particles.

9. The information recording medium according to claim 7, wherein the ink receiving layer contains a cationic compound.

10. The information recording medium according to claim 7, wherein the ink receiving layer has a thickness of 1 to 100 µm.

11. The information recording medium according to claim 7, wherein an adhesive layer and a releasing layer are provided on a surface of the base material other than that on which the ink receiving layer is provided.

12. The information recording medium according to claim 7, wherein said medium is in the form of cut sheets.

13. The information recording medium according to claim 7, wherein said medium is in the form of a roll.

14. An information recording medium comprising an electronic information storing circuit part and an ink receiving layer, in this order, and further comprising a baffler layer which is a base material composed of a water-repellent material, wherein the baffler layer is provided between the electronic information storing circuit part and the ink receiving layer so as to prevent an ink applied with an ink jet head to the ink receiving layer from reaching the electronic information storing circuit part, and wherein the barrier layer has an air permeability of at least 300 sec/100 cc as measured in accordance with the Gurley air permeability method.

15. The information recording medium according to claim 14, wherein the ink receiving layer contains inorganic fine particles.

16. The information recording medium according to claim 14, wherein the ink receiving layer contains a cationic compound.

17. The information recording medium according to claim 14, wherein the ink receiving layer has a thickness of 1 to 100 µm.

18. The information recording medium according to claim 14, wherein an adhesive layer and a releasing layer are provided on a surface of the base material other than that on which the ink receiving layer is provided.

19. The information recording medium according to claim 14, wherein said medium is in the form of cut sheets.

20. The information recording medium according to claim 14, wherein said medium is in the form of a roll.

* * * * *

UNITED STATES PATENT AND TRADEMARK OFFICE
CERTIFICATE OF CORRECTION

PATENT NO. : 6,977,112 B2  Page 1 of 1
APPLICATION NO. : 09/900008
DATED : December 20, 2005
INVENTOR(S) : Yoshiyuki Shino et al.

It is certified that error appears in the above-identified patent and that said Letters Patent is hereby corrected as shown below:

COLUMN 2
Line 16, "points" should read --point--.

COLUMN 3
Line 3, "tag" should read --tags--.

COLUMN 7
Line 10, "material" should read --materials--.

COLUMN 10
Line 12, "be all" should read --all be--.
Line 58, "be now" should read --now be--.

COLUMN 12
Line 36, "conposed" should read --composed--.

COLUMN 13
Line 51, "less." should read --less,--.

COLUMN 14
Line 35, "baffler" should read --barrier--.
Line 38 "baffler" should read --barrier--.

Signed and Sealed this

Fifteenth Day of August, 2006

JON W. DUDAS
*Director of the United States Patent and Trademark Office*